FIVE STATE FLUID LOGIC ELEMENT

Filed Dec. 4, 1964

INVENTOR.
TREVOR DRAKE READER

BY Thomas P. Murphy
AGENT

United States Patent Office 3,366,130

Patented Jan. 30, 1968

3,366,130

FIVE STATE FLUID LOGIC ELEMENT

Trevor Drake Reader, King of Prussia, Pa., assignor to Sperry Rand Corporation, New York, N.Y., a corporation of Delaware Filed Dec. 4, 1964, Ser. No. 415,926
2 Claims. (Cl. 137—81.5)

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to a multi-state element and more particularly to a multi-state passive fluid element.

The term fluid amplifier has generally been applied to various types of fluid devices whether or not amplification, i.e., control of high energy fluid streams by low energy fluid streams actually takes place or not. For example, fluid AND gates and fluid OR gates have commonly been classified as fluid amplifiers when, in fact, no real fluid amplification takes place in them.

Fluid AND gates and fluid OR gates are essentially non-amplifying passive elements. They are passive because neither exhibits memory attributable to the well known boundary layer or lock-on effect. They are non-amplifying because neither utilizes a low energy power stream to control, i.e., switch a high energy fluid.

On the other hand many typical fluid amplifiers, such as a conventional fluid flip-flop, exhibit both memory and amplification. Such fluid devices which exhibit memory attributable to the boundary layer or lock-on effect are referred to as active elements.

All fluid elements of the active type have an inherent disadvantage. This disadvantage lies in the relatively slow switching time due to the lock-on effect. In other words it takes longer for a control signal to switch a power stream locked-on to an output channel's sidewall than if the power stream were not so locked-on. This disadvantage is magnified when the gain advantage associated with lock-on is not desired as in purely logical functions where gain is relatively unimportant.

Active fluid elements have another important disadvantage, i.e., they are very sensitive to element geometry. Thus, dimensions are critical and great care must be exercised in fabrication. Therefore, the fabrication of such devices is both difficult and costly.

Heretofore active fluid elements have often been employed to perform fluid logical functions. Typical of these is the conventional fluid flip-flop. However, this device has only two states and, of course, is subject to the disadvantages pointed out above.

The present invention contemplates a multi-state passive fluid logic element which overcomes the above-pointed out disadvantages. The multi-state passive fluid logic element of the present invention is a device whose output signals are different logical functions of its input signals.

The present invention comprises a passive fluid element constructed to have an interaction chamber and at least two input channels leading into the interaction chamber and at least three output channels leading from the interaction chamber. The two input channels and the three output channels are so disposed relative to the interaction chamber and to each other that each of the output channels receive fluid for at least one of the combinations of fluid inputs possible of being applied to the input channels.

The present invention may comprise an interaction chamber with three input channels and five output channels so disposed to receive fluid for at least one of the several combinations of fluid inputs possible of being applied to the three input channels. The present invention is a passive fluid device to which three input binary variables can be presented and from which issue five outputs (one of which may be ambiguous). With such a fluid device four out of the eight possible combinations of three variables can be instantly decoded. Two such devices (with complementary input signals) are sufficient for complete decoding of three variables.

The fluid inputs to the present device are all of one pressure level. The present invention doesn't utilize a fluid power stream as typical used in active fluid devices, i.e., a high energy power stream acted upon by low energy control pulses. Instead the present invention relies on the interaction of fluid streams of equal energy levels.

The present invention performs in a single logical element the logical functions of eight passive AND gates. Thus, the number of logical functions which can be performed by the present invention substantially reduces the number of levels of logic and the attendant associated structure in a given fluid logic system. Furthermore, since the fluid element of the present invention does not require a constantly "on" power stream there is a savings in power when the present invention is not in actual use.

It is an object of the present invention to provide a multi-state passive fluid logic element.

It is another object of the present invention to provide a multi-state fluid logic element which is faster in operation and substantially less sensitive to element geometry than elements heretofore available.

A further object of the present invention is to provide a multi-state fluid logic element which being substantially insensitive to element geometry is simpler and more economical to fabricate than logical elements heretofore available.

Yet another object of the present invention is to provide a logic element which performs in one unitary device the functions which heretofore required at least eight separate logical elements.

A still further object of the present invention is to provide a multi-state fluid logic element which because it performs a plurality of logical functions heretofore requiring a plurality of logical elements takes up less space and is more economical to fabricate than the previously available logical equivalents.

Other objects and many of the attendant advantages of the present invention will become more apparent with the reading of the description taken in conjunction with the accompanying drawings wherein like reference numerals are used to indicate like parts thereof and wherein.

Figure 1:
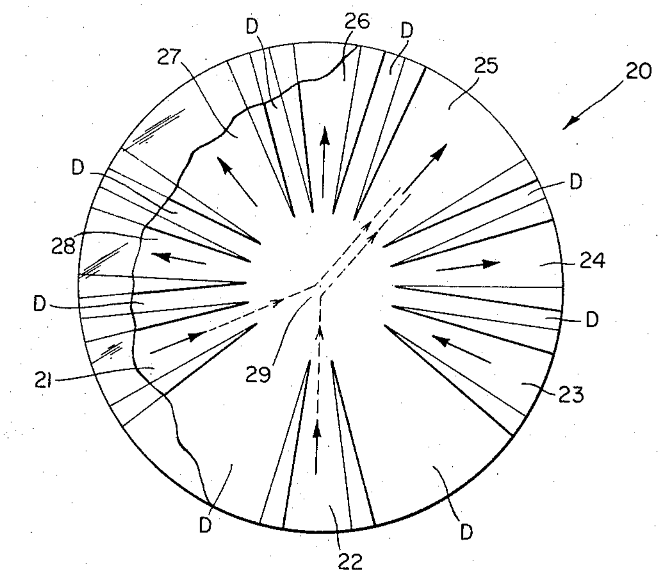
FIGURE 1 illustrates a preferred embodiment of the present invention.

FIGURE 1 illustrates a five state fluid logical element or more precisely a three input-five output passive fluid element 20 hereinafter referred to as the 3–5 element 30. The particular mode of fabrication of the 3–5 element 20 forms no part of this invention. The 3–5 element 20 may be fabricated in any convenient manner, for example, the various input and output channels and passageways may be cut, machined or molded from a first sheet of plastic which is covered over by a second sheet of plastic fixedly secured thereto.

The 3–5 element 20 comprises three converging input channels 21, 22 and 23 which open into and are symmetrically and angularly disposed about an interaction chamber 29. Five diverging output channels 24 through 28 lead from the interaction chamber 29. The output channels 24 through 28 are symmetrically and angularly disposed about the interaction chamber 29.

The output channel 26 is disposed in direct alignment with the input channel 22; the output channel 28 is disposed in direct alignment with the input channel 23; the output channel 24 is disposed in direct alignment with the input channel 21. The output channel 25 is so disposed relative to the input channels 21 and 22 that a line drawn coincident with the axis of the output channel 25 bisects the angle formed by the intersection of the lines drawn coincident with the axis of the input channels 21 and 22. The output channel 27 is so disposed relative to the input channels 22 and 23 that a line drawn coincident with the axis of the output channel 27 bisects the angle formed by the intersection of the lines drawn coincident with the axis of the input channels 22 and 23.

Passageways D which are disposed between adjacent input and output channels cause the interaction chamber 29 to communicate with an area external to the 3–5 element 20, for example, the atmosphere. The openings of the output channels 25 and 27 which communicate with the interaction chamber 29 are larger (up to two times as large) than the openings of the remaining input and output channels which are equal to each other.

When the input channel 21 has a fluid input, the output channel 24 has an output in the form of a power stream. When the input channel 23 has an input, the output channel 28 has an output. When the input channel 22 has an input, the output channel 26 has an output. There are three combinations of inputs to the input channels 21, 22 and 23 which provide an output at the output channel 26. Therefore, in actual practice in order to prevent ambiguity of outputs from occurring at output channel 26 the inputs to input channels 21 and 23 should be mutually exclusive.

When inputs of equal magnitude are simultaneously applied to the input channels 22 and 23, the power streams therefrom interact and combine within the interaction chamber 29 to provide a resultant output in the output channel 27. Similarly, when the input channels 21 and 22 have simultaneous inputs of equal magnitude, the output channel 25 has an output. The larger openings of the output channels 25 and 27 which communicate with the interaction chamber 29 accommodate this combination of two inputs which, of course, results in twice as much of fluid flow as when there is only one input. The various passageways D permit excess air due to the inputs to be discharged without affecting the output pressure levels.

The 3–5 element 20 is a true passive element in that there is no lock-on boundary layer effect in any of the output channels. Furthermore, it should be noticed that since the 3–5 element 20 is a passive fluid element, it is faster switching than a conventional active fluid element.

Figure 2:
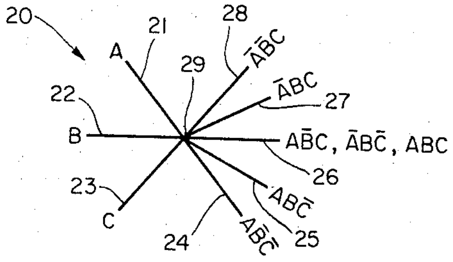
FIGURE 2 illustrates a schematic representation of the embodiment of FIGURE 1.

FIGURE 2 illustrates the embodiment of FIGURE 1 in schematic form. The input channels 21, 22 and 23 and the output channels 24, 25, 26, 27, and 28 are indicated by the same reference numerals as their counterparts in FIGURE 1. The possible inputs to the 3–5 element are shown by the letters A, B and C. The resulting outputs due to the various combinations of A, B and C inputs are also indicated. Thus, when the 3–5 element has an input A, it has an output at the output channel 24 indicated by $A\bar{B}\bar{C}$.

When the 3–5 element 20 has an input C, it has an output at the output channel 28 indicated by $\bar{A}\bar{B}C$. When the 3–5 element has inputs A and B, it has an output indicated by $\bar{A}BC$ at the output channel 27. When the 3–5 element 20 has inputs B and C, it has an output at the output channel 27 indicated by $\bar{A}BC$. Also the output channel 26 may have an output for three possible combinations of inputs. This is indicated by the expressions $A\bar{B}C$, $\bar{A}B\bar{C}$ and $ABC$ associated with the output channel 26. As is obvious the outputs possible on the output channel 26 may produce two ambiguities. However, by making the inputs to the input channels 21 and 23 mutually exclusive, that is, the input channel 21 may not have an input while the input channel 23 does have an input and vice-versa, this ambiguity may be overcome in practice.

The embodiments of the invention in which an exclusive property or privilege is claimed are defined as follows:

1. A fluid element comprising, a fluid interaction chamber; first, second and third fluid input channels leading into said interaction chamber; said input channels being angularly disposed to one another so that their axes intersect at a predetermined point in said interaction chamber; first, second and third fluid output channels leading from said interaction chamber, the axes of said output channels being substantially aligned with the axes of the respective input channels; fourth and fifth output channels located respectively between the first and second and the second and third output channels, said fourth output channel being disposed so that is axis bisects the angle between the first and second input channels, said fifth output channel being disposed so that its axis bisects the angle between the second and third input channels; each of said output channels being adapted to be connected to a fluid load and each providing a fluid signal output in accordance with a predetermined logic function of the input signals applied to the input channels; and a separate venting passageway disposed between each of said input and output channels, said venting passageways connecting said interaction chamber to substantially atmospheric pressure.

2. A logic element as set forth in claim 1 wherein said fourth and fifth output channels have cross-sectional openings substantially twice as large as the cross-sectional openings of the other output channels.

References Cited

UNITED STATES PATENTS

| | | | |
|---|---|---|---|
| 3,122,165 | 2/1964 | Horton | 137—81.5 |
| 3,182,675 | 5/1965 | Zilberfarb et al. | 137—81.5 |
| 3,240,220 | 3/1966 | Jones | 137—81.5 |
| 3,272,214 | 9/1966 | Warren | 137—81.5 |
| 3,275,013 | 9/1966 | Colston | 137—81.5 |

M. CARY NELSON, *Primary Examiner.*

S. SCOTT, *Assistant Examiner.*